United States Patent
Sato

(10) Patent No.: US 10,635,091 B2
(45) Date of Patent: Apr. 28, 2020

(54) MACHINING CONDITION ADJUSTMENT DEVICE AND MACHINE LEARNING DEVICE

(71) Applicant: FANUC Corporation, Yamanashi (JP)

(72) Inventor: Naoki Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/169,770

(22) Filed: Oct. 24, 2018

(65) Prior Publication Data

US 2019/0129386 A1 May 2, 2019

(30) Foreign Application Priority Data

Oct. 31, 2017 (JP) .................. 2017-210277

(51) Int. Cl.
*G05B 11/01* (2006.01)
*G05B 19/416* (2006.01)

(52) U.S. Cl.
CPC .................. *G05B 19/416* (2013.01)

(58) Field of Classification Search
CPC .. G05B 19/416; H04N 17/002; H04N 5/2173; H04N 5/23206; H04N 5/2352; H04N 7/035; H04N 7/181
USPC ....................................................... 318/635
See application file for complete search history.

(56) References Cited

U.S. PATENT DOCUMENTS

| 8,026,689 B2 | 9/2011 | Iwashita et al. |
| 9,952,574 B2 * | 4/2018 | Mukai ................ G05B 13/0265 |
| 2016/0147212 A1 | 5/2016 | Kurosumi |
| 2017/0031330 A1 | 2/2017 | Shiraishi et al. |
| 2017/0090430 A1 | 3/2017 | Nakazawa |
| 2017/0227950 A1 | 8/2017 | Kinoshita et al. |
| 2018/0307211 A1 * | 10/2018 | Aizawa ................ G05B 19/416 |

FOREIGN PATENT DOCUMENTS

| JP | 4643725 B2 | 3/2011 |
| JP | 2016097491 A | 5/2016 |
| JP | 2017030152 A | 2/2017 |
| JP | 2017064837 A | 4/2017 |
| JP | 2017142595 A | 8/2017 |
| WO | 2014041686 A1 | 3/2014 |

\* cited by examiner

*Primary Examiner* — Eduardo Colon Santana
*Assistant Examiner* — Gabriel Agared
(74) *Attorney, Agent, or Firm* — Hauptman Ham, LLP

(57) ABSTRACT

A machine learning device of a machining condition adjustment device includes: a state observation unit that observes each of machining condition data indicative of a machining condition of each used tool and cycle time data indicative of a cycle time of one machining, as a state variable; a determination data acquisition unit that acquires determination data indicative of a result of an appropriateness determination of one machining in the case where an adjustment of the machining condition is performed; and a learning unit that performs learning by associating the machining condition data and the cycle time data with the adjustment of the machining condition using the state variable and the determination data so as to enables effective use of the allowance of a cycle time.

11 Claims, 7 Drawing Sheets

MACHINING CONDITION ADJUSTMENT DEVICE AND MACHINE LEARNING DEVICE

RELATED APPLICATIONS

The present application claims priority of Japanese Application Number 2017-210277, filed on Oct. 31, 2017, the disclosure of which is hereby incorporated by reference herein in its entirety.

BACKGROUND OF THE INVENTION

1. Field of the Invention

The present invention relates to a machining condition adjustment device and a machine learning device, and particularly relates to an operation planning device and a machine learning device for determining machining conditions of a plurality of machine tools.

2. Description of the Related Art

In general, in the case where a user who performs machining of components by using a machine tool machines a large number of mass-produced parts, with importance placed on machining in shorter cycle time in view of productivity, machining is performed under a strict machining condition such that machining time is reduced while machine accuracy is maintained at a certain level.

However, in the case where machining of a part is performed in a line constituted by a plurality of machine tools by allocating machining steps to the individual machine tools, the machine tool having the longest cycle time becomes a bottle neck, and it is not possible to reduce the cycle time of the entire line even when the cycle times of the other machine tools are reduced.

For example, as shown in FIG. 8, in a line in which machining is performed by sequentially using four machine tools and the final product is thereby produced, in the case where a cycle time 2 that is a time required for a machining process and the like in Step 2 is the longest cycle time, when the previous machining process by the machine tool used in Step 2 is not completed, in Step 2 it is not possible to machine a workpiece machined in Step 1 due to a wait for completion of the previous machining process. Consequently, even when a strict machining condition is set for the machine tool used in Step 1 such that a cycle time 1 that is a time required for the machining process and the like in Step 1 is reduced, the number of workpieces to be machined in Step 2 is increased between Step 1 and Step 2 uselessly, and a significant reduction in the cycle time of the entire line is not achieved. In addition, a workpiece to be machined in Step 3 does not reach Step 3 unless the machining process in Step 2 is ended. Consequently, even when a strict machining condition is set for the machine tool used in Step 3 such that a cycle time 3 that is a time required for the machining process and the like in Step 3 is reduced, the idle time of the machine tool in Step 3 is increased uselessly, and a significant reduction in the cycle time of the entire line is not achieved. To cope with this, in such a line, the machining conditions of the machine tools other than the machine tool having the longest cycle time are set such that the machining processes are performed with the cycle times set correspondingly to the machine tool having the longest cycle time, and the machining conditions are adjusted for purposes other than a reduction in cycle time (e.g., an improvement in machine accuracy, maintenance of life of a tool or the like, and a reduction in power consumption).

As the conventional art for adjusting the machining condition, for example, Japanese Patent No. 4643725 discloses the technique of optimally reducing power consumption of the entire machine tool.

In the case where the machining condition is adjusted with importance placed on, e.g., a reduction in power consumption, a change such as a reduction in cutting feedrate or spindle speed is added as the machining condition typically. However, in a machining operation based on a machining program, various machining processes such as milling, drilling, and tapping are performed by using various machining tools, and power consumption differs depending on a machining method or a tool used in the machining process. In addition, various conditions are complexly related to power consumption. For example, there are cases where a reduction in acceleration/deceleration for reducing power consumption results in increases in the movement time of a spindle and overall power consumption. Consequently, it is difficult to determine how power consumption can be reduced most effectively in the allowance of the cycle time in the line constituted by a plurality of the machine tools by changing the machining condition.

SUMMARY OF THE INVENTION

To cope with this, an object of the present invention is to provide a machining condition adjustment device and a machine learning device that allow adjustment of a machining condition that enables effective use of the allowance of a cycle time in a line constituted by a plurality of machine tools.

The present invention introduces a machine learning device that constructs a learning model in which power consumption and a cycle time are taken into consideration based on state data such as a machining condition of each tool used in machining by a manufacturing machine (a spindle speed, a cutting feedrate, and the like) and the cycle time into a machining condition adjustment device that sets the machining conditions of a plurality of the manufacturing machines. In the machining condition adjustment device of the present invention, it is possible to perform the adjustment of the machining condition based on the state data obtained from the manufacturing machine by using the learning model that is a learning result of the machine learning device, and evaluate the content of the adjustment of the machining condition by using, as determination data, the power consumption and the cycle time resulting from execution of a machining operation based on the adjusted machining condition.

An aspect of the present invention is a machining condition adjustment device for adjusting a machining condition of each of a plurality of manufacturing machines constituting a line, the machining condition adjustment device including: a machine learning device that learns an adjustment of the machining condition of the manufacturing machine, the machine learning device including a state observation unit that observes each of machining condition data indicative of the machining condition of each used tool used in machining by the manufacturing machine and cycle time data related to a cycle time of one machining by the manufacturing machine, as a state variable representing a current state of an environment, a determination data acquisition unit that acquires determination data indicative of a result of an appropriateness determination of one machining by the manufacturing machine in a case where the adjustment of the machining condition is performed, and a learning unit that performs learning by associating the machining condition data and the cycle time data with the adjustment of the machining condition using the state variable and the determination data.

Another aspect of the present invention is a machine learning device for learning an adjustment of a machining condition of each of a plurality of manufacturing machines constituting a line, the machine learning device including: a state observation unit that observes each of machining condition data indicative of the machining condition of each used tool used in machining by the manufacturing machine and cycle time data related to a cycle time of one machining by the manufacturing machine, as a state variable representing a current state of an environment; a determination data acquisition unit that acquires determination data indicative of a result of an appropriateness determination of one machining by the manufacturing machine in a case where the adjustment of the machining condition is performed; and a learning unit that performs learning by associating the machining condition data and the cycle time data with the adjustment of the machining condition using the state variable and the determination data.

According to the present invention, in a machining line that uses a plurality of the manufacturing machines, with the cycle time equal to or shorter than the longest cycle time of one of the manufacturing machines set as a target, machining by each of the other manufacturing machines can be performed under the machining condition that minimizes power consumption and, as a result, energy saving of the entire machining line is allowed.

DETAILED DESCRIPTION OF THE PREFERRED EMBODIMENTS

Hereinbelow, an embodiment of the present invention will be described with reference to the drawings.

Figure 1:
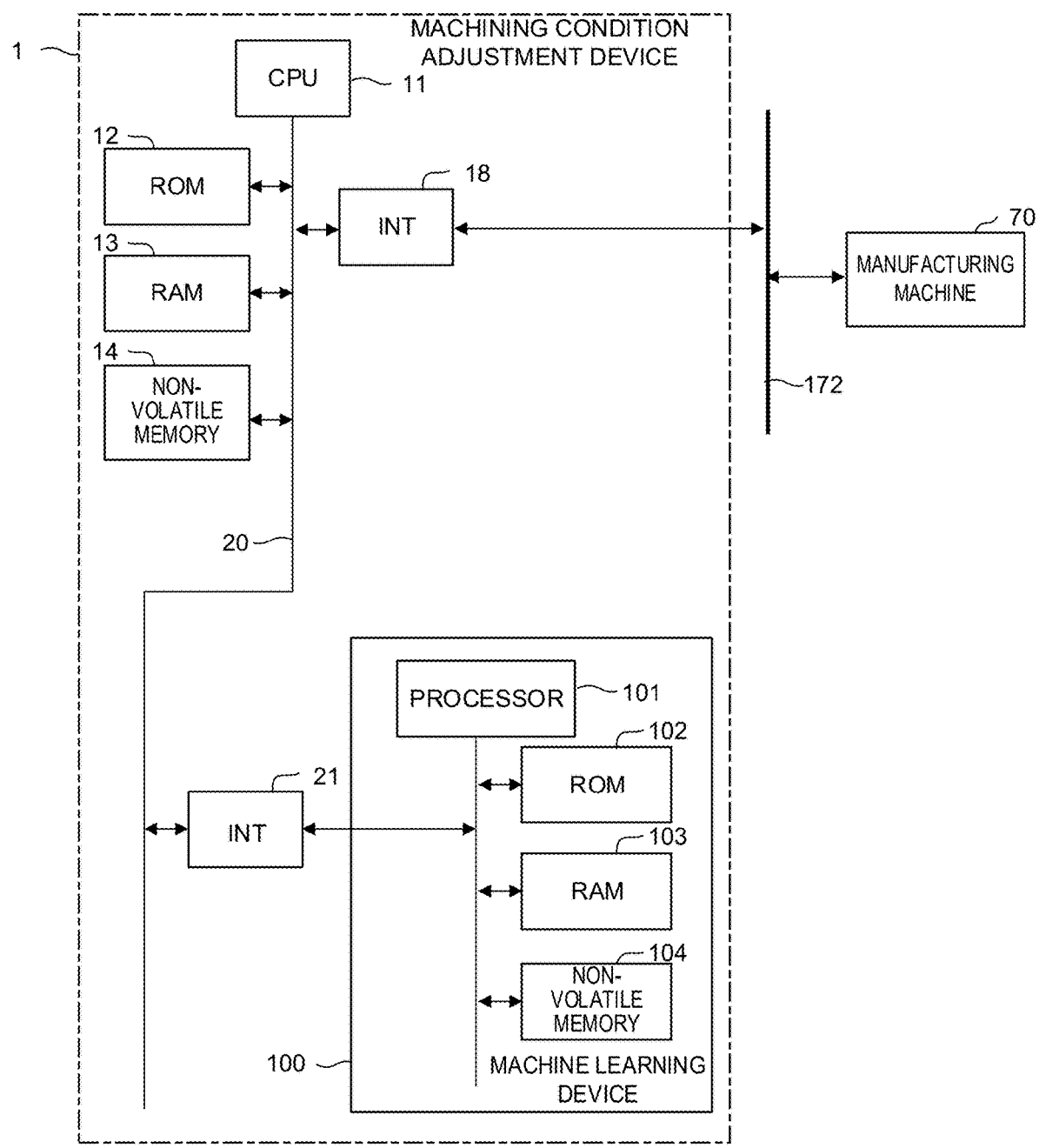
FIG. 1 is a schematic hardware configuration diagram of a machining condition adjustment device according to a first embodiment.

FIG. 1 is a schematic hardware configuration diagram showing the principal portion of a machining condition adjustment device according to a first embodiment. A machining condition adjustment device 1 can be mounted as part of a control device that controls a manufacturing machine such as, e.g., a machine tool. In addition, the machining condition adjustment device 1 can be mounted as part of a computer such as, e.g., a cell computer, a host computer, or a cloud server that is connected to the manufacturing machine via a network. A CPU 11 of the machining condition adjustment device 1 according to the present embodiment is a processor that controls the entire machining condition adjustment device 1. The CPU 11 reads a system program stored in a ROM 12 via a bus 20, and controls the entire machining condition adjustment device 1 according to the system program. A RAM 13 temporarily stores temporary calculation data and display data, and various pieces of data input by an operator via an input unit that is not shown.

A non-volatile memory 14 is configured as a memory in which a storage state is maintained by being backed up using, e.g., a battery that is not shown even when the machining condition adjustment device 1 is powered off.

The non-volatile memory 14 stores various pieces of data input by the operator via the input unit that is not shown, various pieces of data acquired from a manufacturing machine 70 connected to a wired/wireless network 172 via an interface 18 (e.g., a machining program executed by the manufacturing machine 70, power consumption and current consumption detected in the manufacturing machine 70, and the like), and a program input via an interface that is not shown. The programs and pieces of data stored in the non-volatile memory 14 may be loaded into the RAM 13 during execution/use. In addition, in the ROM 12, various system programs such as a known analysis program (including a system program for controlling exchange with a machine learning device 100 described later) are written in advance.

The manufacturing machine 70 constitutes a line serving as the target of adjustment of power consumption by the machining condition adjustment device 1. The manufacturing machine 70 may be a proceeding machine such as, e.g., a machine tool, an electrical discharge machine, or an injection molding machine. The manufacturing machine 70 can receive a command from the CPU 11 via the interface 18 and the network 172, and set a machining condition and the like used during a machining operation. In addition, the manufacturing machine 70 notifies the CPU 11 of a machining program used in the machining operation, and measurement values measured by power measurement devices and current measurement devices provided in individual units via the network 172 and the interface 18.

An interface 21 is the interface for connecting the machining condition adjustment device 1 and the machine learning device 100. The machine learning device 100 includes a processor 101 that controls the entire machine learning device 100, a ROM 102 that stores a system program or the like, a RAM 103 for performing temporary storage in each process related to machine learning, and a non-volatile memory 104 that is used for storing a learning model or the like. The machine learning device 100 can observe individual pieces of information that can be acquired in the machining condition adjustment device 1 via the interface 21 (e.g., the machining program executed by the manufacturing machine 70 and the power consumption and current consumption detected in the manufacturing machine 70). The machining condition adjustment device 1 receives an adjustment command of the machining condition of the manufacturing machine 70 output from the machine learning device 100 to control the manufacturing machine 70.

Figure 2:
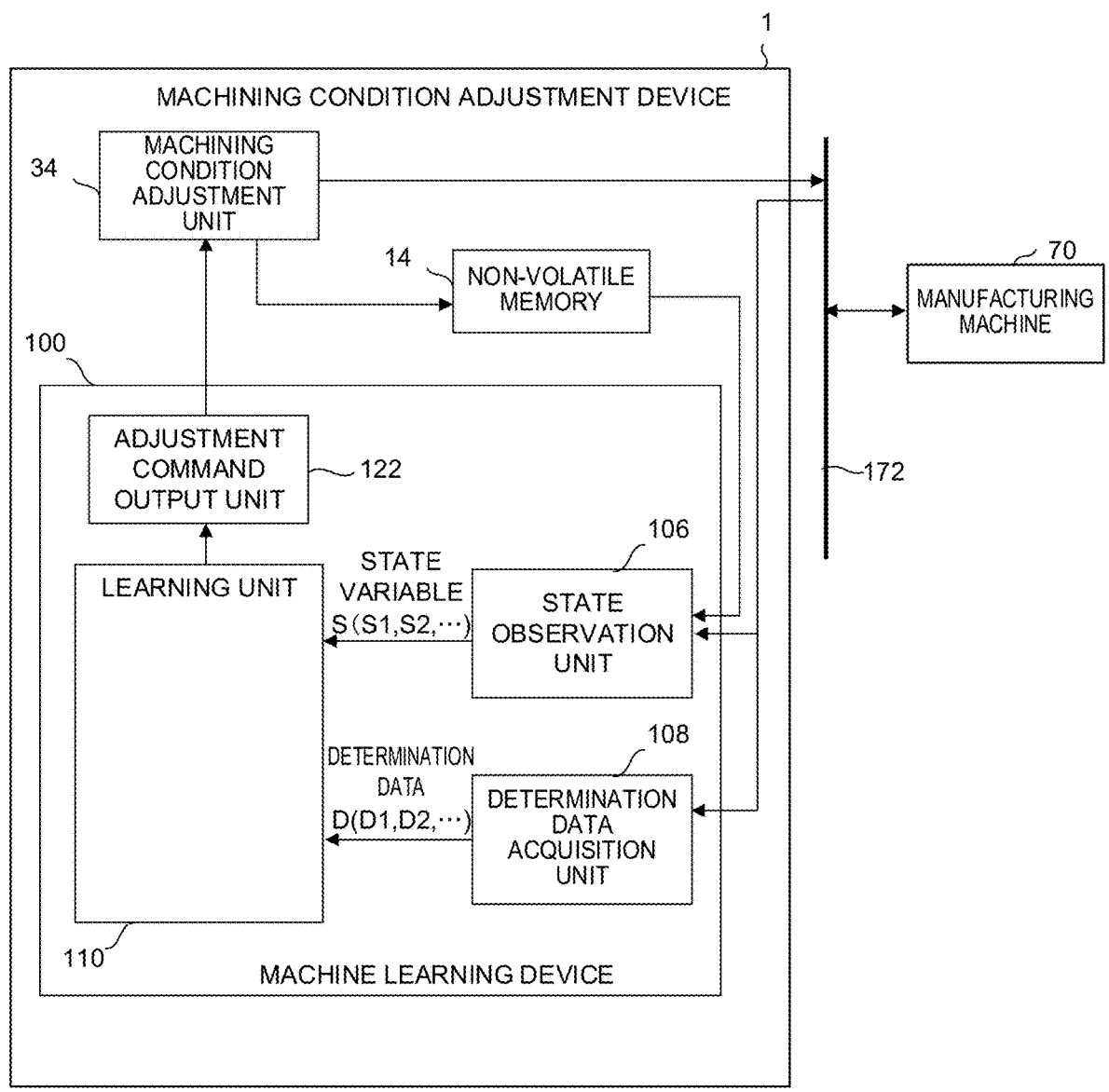
FIG. 2 is a schematic functional block diagram of the machining condition adjustment device according to the first embodiment.

FIG. 2 is a schematic functional block diagram of the machining condition adjustment device 1 and the machine learning device 100 according to the first embodiment. The CPU 11 of the machining condition adjustment device 1 and the processor 101 of the machine learning device 100 shown in FIG. 1 execute their respective system programs to control the operations of the individual units of the machining condition adjustment device 1 and the machine learning device 100, and the individual functional blocks shown in FIG. 2 are thereby implemented.

The machining condition adjustment device 1 of the present embodiment includes a machining condition adjustment unit 34 that adjusts the machining condition in the machining operation by the manufacturing machine 70 based on the adjustment command output from the machine learning device 100. Examples of the machining condition in the machining operation by the manufacturing machine 70 that is adjusted by the machining condition adjustment unit 34 include the spindle speed and cutting feedrate of each used tool in the machining operation performed in the manufacturing machine 70. However, the machining condition is not limited thereto, and the machining condition that can be adjusted by using the function and specifications of the manufacturing machine 70 may also be output.

The machine learning device 100 of the present embodiment includes software (a learning algorithm or the like) and hardware (the processor 101 or the like) for learning an adjustment of the machining condition of each used tool used in machining by the manufacturing machine 70 to the machining condition of each used tool used in the machining by the manufacturing machine 70 by so-called machine learning. What is learned by the machine learning device 100 of the machining condition adjustment device 1 corresponds to a model structure that represents a correlation between the machining condition of each used tool used in the machining by the manufacturing machine 70 and the cycle time of one machining by the manufacturing machine 70, and the adjustment of the machining condition of each used tool used in the machining by the manufacturing machine 70.

As shown in FIG. 2 by using the functional blocks, the machine learning device 100 of the machining condition adjustment device 1 includes a state observation unit 106 that observes each of machining condition data S1 indicative of the machining condition of each used tool used in the machining by the manufacturing machine 70 and cycle time data S2 related to the cycle time of one machining by the manufacturing machine 70 as a state variable S representing the current state of an environment, a determination data acquisition unit 108 that acquires determination data D that includes power consumption data D1 indicative of electric power consumed in the machining operation by the manufacturing machine 70 and cycle time determination data D2 indicative of the cycle time in the machining operation by the manufacturing machine 70 in the case where the adjustment of the machining condition of each used tool used in the machining by the manufacturing machine 70 is performed, and a learning unit 110 that performs learning by associating the adjustment of the machining condition of each used tool used in the machining by the manufacturing machine 70 with the machining condition of each used tool used in the machining by the manufacturing machine 70 using the state variable S and the determination data D.

Figure 3:
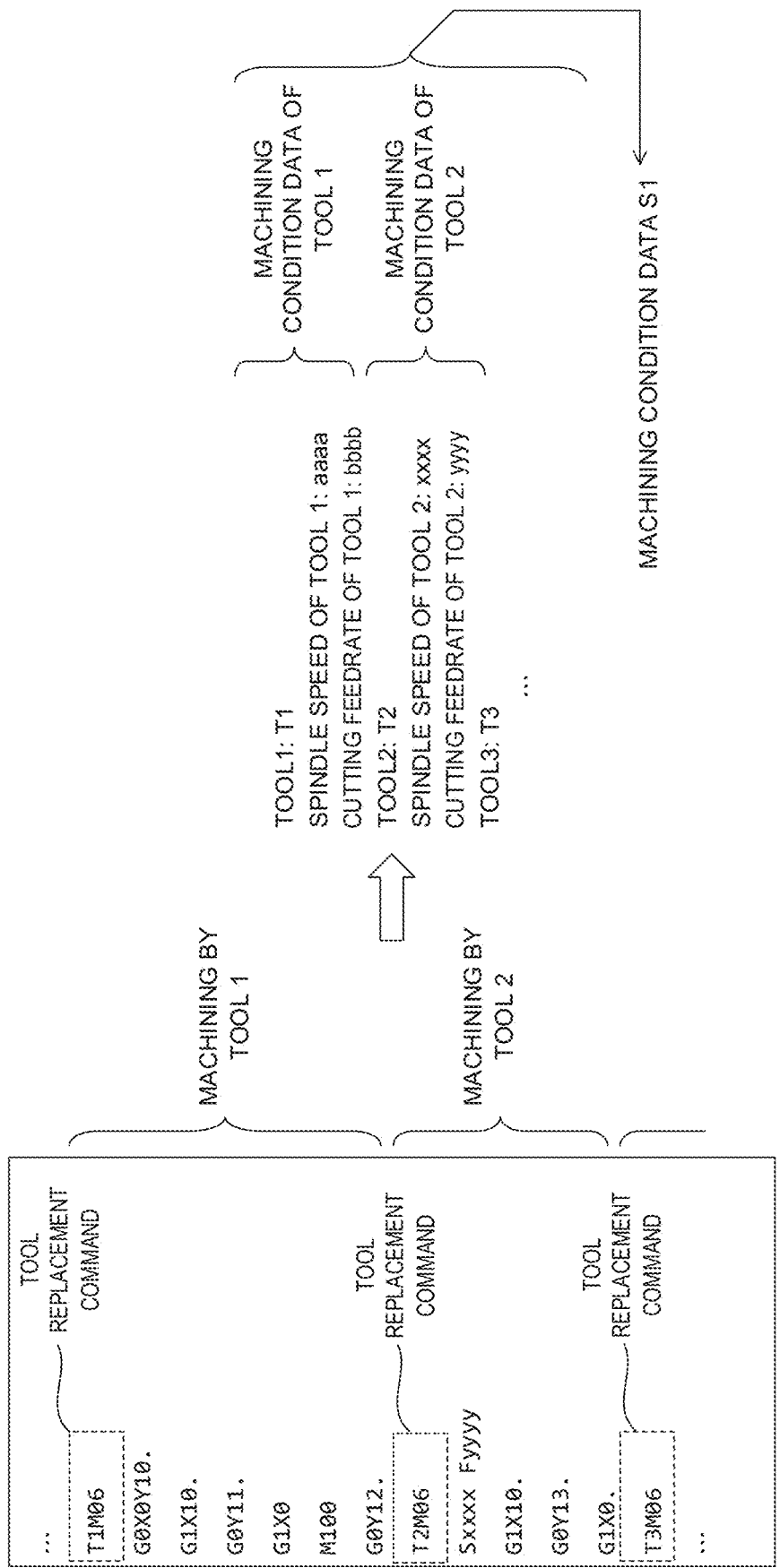
FIG. 3 is a view for explaining machining condition data.

Among the state variables S observed by the state observation unit 106, the machining condition data S1 can be acquired as a set of the machining conditions of each used tool used in the machining operation by the manufacturing machine 70. As the machining condition of each used tool used in the machining operation by the manufacturing machine 70, it is possible to use the spindle speed and the cutting feedrate. The machining condition of each used tool used in the machining operation by the manufacturing machine 70 can be acquired from the machining program executed in the manufacturing machine 70 and parameters or the like set in the manufacturing machine 70. For example, in the case where the machining condition data S1 is acquired from the machining program shown in FIG. 3 as an example, it is only necessary to analyze the machining program to determine the tool used in the machining from a tool replacement command, and determine the spindle speed and the cutting feedrate of the machining by each tool from a spindle speed command S and a feedrate command F. In addition, the machining condition that is not specified explicitly in the machining program can be acquired from parameters or the like set in the manufacturing machine 70 (in the example in FIG. 3, the default value of the spindle speed aaaa and the default value of the feedrate bbbb are set as parameters, and these values are determined to be the machining condition of a tool 1). A set of data related to the machining condition of each tool used in the machining in the manufacturing machine 70 obtained in this manner is appropriately used as the machining condition data S1.

Among the state variables S observed by the state observation unit 106, the cycle time data S2 can be acquired as the cycle time of one machining by the manufacturing machine 70. As the cycle time data S2, the cycle time of one machining by the manufacturing machine 70 may be used, and a difference (allowance) between the cycle time of one machining by the manufacturing machine 70 and, among the cycle times of a plurality of the manufacturing machines constituting the line, the longest cycle time (hereinbelow referred to as the longest cycle time) may also be used. Further, to the cycle time data S2, the matrix value of the cycle time of each used tool may be added.

The machining condition data S1 and the cycle time data S2 can be acquired online from the individual manufacturing machines 70 constituting the line. In addition, the machining condition data S1 and the cycle time data S2 may also be acquired from the machining program used in previously performed machining. In the case of the latter, it is not possible to determine the appropriateness of the power consumption and the cycle time in real time, but it is possible to advance the learning by using, e.g., a known simulation device in combination and acquiring estimated values of the power consumption and the cycle time from the result of a simulation.

As the machining condition data S1, it is possible to use a result obtained by applying the adjustment of the machining condition of each used tool used in the machining by the manufacturing machine 70 that is determined in the immediately preceding learning period by the machine learning device 100 based on the learning result of the learning unit 110 to the machining condition of each tool used in the manufacturing machine 70 in the immediately preceding learning period. In the case where such a method is used, the machine learning device 100 may temporarily store the result of the adjustment of the machining condition of each used tool used in the machining by the manufacturing machine 70 to the machining condition data S1 in the RAM 103 for each learning period, and the state observation unit 106 may acquire, from the RAM 103, a value obtained by applying the adjustment of the machining condition of each used tool used in the machining by the manufacturing machine 70 that is determined by the machine learning device 100 to the machining condition data S1 in the immediately preceding learning period as the machining condition data S1 in the current learning period.

The determination data acquisition unit 108 can use, as the power consumption data D1, electric power consumed in the machining operation by the manufacturing machine 70 in the case where the adjustment of the machining condition of each used tool used in the machining by the manufacturing machine 70 is performed. The value of electric power consumed in one machining by the manufacturing machine 70 that is calculated based on the measurement value acquired by the power measurement device or the current measurement device mounted to the manufacturing machine 70 may also be used as the power consumption data D1 used by the determination data acquisition unit 108. The power consumption data D1 may be used as an index indicative of the amount of reduction in power consumption with respect to, e.g., a predetermined reference power consumption value. Alternatively, the power consumption data D1 may also be used as an index indicative of the amount of reduction in power consumption during machining performed in the current learning period with respect to power consumption during machining performed in the immediately preceding learning period.

In addition, the determination data acquisition unit 108 can use, as the cycle time determination data D2, the cycle time in the machining operation by the manufacturing machine 70 in the case where the adjustment of the machining condition of each used tool used in the machining by the manufacturing machine 70 is performed. A time spent on one machining measured in the manufacturing machine 70 may be used as the cycle time determination data D2 used by the determination data acquisition unit 108. The cycle time determination data D2 may be used as an index indicative of closeness to the longest cycle time (longest cycle time) among cycle times each spent on one machining measured in the first machining in each of a plurality of the manufacturing machines 70 connected to the line (cycle times of the individual manufacturing machines 70).

When the state variables S simultaneously input to the learning unit 110 are considered on the basis of the learning period of the learning unit 110, the state variables S are based on data in an immediately preceding learning period in which the determination data D is acquired. Thus, while the machine learning device 100 of the machining condition adjustment device 1 advances the learning, the acquisition of the machining condition data S1 and the cycle time data S2, the execution of the adjustment of the machining condition of the manufacturing machine 70 based on the machining condition data S1 and the cycle time data S2, and the acquisition of the determination data D are repeatedly performed in the environment.

The learning unit 110 learns the adjustment of the machining condition of each used tool used in the machining by the manufacturing machine 70 to the machining condition of each used tool used in the machining by the manufacturing machine 70 and the cycle time of one machining by the manufacturing machine 70 according to any learning algorithm that is collectively referred to as machine learning. The learning unit 110 can repetitively execute the learning based on the data set including the state variables S and the determination data D described above. During the repetition of a learning cycle of the adjustment of the machining condition of each used tool used in the machining by the manufacturing machine 70 to the machining condition of each used tool used in the machining by the manufacturing machine 70 and the cycle time of one machining by the manufacturing machine 70, among the state variables S, the machining condition data S1 is acquired from the machining condition of each tool subjected to the adjustment of the machining condition in the immediately preceding learning period as described above, the cycle time data S2 is acquired by measuring the time of machining performed under the adjusted machining condition, and the result of an appropriateness determination of one machining performed based on the adjusted machining condition is used as the determination data D.

By repeating the learning cycle described above, the learning unit 110 can automatically recognize features suggestive of a correlation between the machining condition of each used tool used in the machining by the manufacturing machine 70 and the cycle time of one machining by the manufacturing machine 70, and the adjustment of the machining condition of each used tool used in the machining by the manufacturing machine 70 to the state. The correlation between the machining condition of each used tool used in the machining by the manufacturing machine 70 and the cycle time of one machining by the manufacturing machine 70, and the adjustment of the machining condition of each used tool used in the machining by the manufacturing machine 70 is substantially unknown at the start of the learning algorithm, but the learning unit 110 gradually recognizes the features and interprets the correlation as the learning unit 110 advances the learning. When the correlation between the machining condition of each used tool used in the machining by the manufacturing machine 70 and the cycle time of one machining by the manufacturing machine 70, and the adjustment of the machining condition of each used tool used in the machining by the manufacturing machine 70 is interpreted to such an extent that a certain level of reliability is achieved, the learning result repetitively output by the learning unit 110 can be used for performing selection of an action (i.e., decision making) related to how to handle the adjustment of the machining condition of each used tool used in the machining by the manufacturing machine 70 to the current state (i.e., the machining condition of each used tool used in the machining by the manufacturing machine 70 and the cycle time of one machining by the manufacturing machine 70). That is, with the progress of the learning algorithm, the learning unit 110 can cause the correlation between the machining condition of each used tool used in the machining by the manufacturing machine 70 and the cycle time of one machining by the manufacturing machine 70, and the action related to setting values in the adjustment of the machining condition of each used tool used in the machining by the manufacturing machine 70 to the state to gradually approach the optimal solution.

An adjustment command output unit 122 determines the adjustment of the machining condition of each used tool used in the machining by the manufacturing machine 70 based on the result of the learning of the learning unit 110, and outputs the content of the determined adjustment to the machining condition adjustment unit 34 as a command. When the machining condition of each used tool used in the machining by the manufacturing machine 70 is input to the machine learning device 100 in a state in which the learning by the learning unit 110 is completed, the adjustment command output unit 122 outputs the adjustment command of the machining condition of each used tool used in the machining by the manufacturing machine 70.

As described above, in the machine learning device 100 of the machining condition adjustment device 1, the learning unit 110 learns the adjustment of the machining condition of each used tool used in the machining by the manufacturing machine 70 according to the machine learning algorithm by using the state variables S observed by the state observation unit 106 and the determination data D acquired by the determination data acquisition unit 108. The state variables S include pieces of data such as the machining condition data S1 and the cycle time data S2, and the determination data D is uniquely determined by analyzing information acquired from the manufacturing machine 70 by the machining condition adjustment device 1. Consequently, according to the machine learning device 100 of the machining condition adjustment device 1, by using the learning result of the learning unit 110, it becomes possible to automatically and accurately perform the adjustment of the machining condition of each used tool used in the machining by the manufacturing machine 70 that corresponds to the machining condition of each used tool used in the machining by the manufacturing machine 70 and the cycle time of one machining by the manufacturing machine 70.

If the adjustment of the machining condition of each used tool used in the machining by the manufacturing machine 70 can be performed automatically, it is possible to speedily determine the proper value of the adjustment of the machining condition of each used tool used in the machining by the manufacturing machine 70 only by grasping the machining condition of each used tool used in the machining by the manufacturing machine 70 (machining condition data S1) and the cycle time of one machining by the manufacturing machine 70 (cycle time data S2). Consequently, it is possible to efficiently perform the determination of the adjustment of the machining condition of each used tool used in the machining by the manufacturing machine 70.

As a modification of the machine learning device 100 of the machining condition adjustment device 1, the state observation unit 106 may further observe machining amount data S3 indicative of a machining amount of each tool in one machining by the manufacturing machine 70 as the state variable S. A value obtained by calculating the total distance of cutting feed for each tool based on, e.g., the analysis result of the machining program may be used as the machining amount data S3.

According to the above modification, it becomes possible for the machine learning device 100 to determine the adjustment of the machining condition of each used tool used in the machining by the manufacturing machine 70 to the machining condition of each used tool used in the machining by the manufacturing machine 70 (machining condition data S1), the cycle time of one machining by the manufacturing machine 70 (cycle time data S2), and the machining amount of each used tool used in the machining by the manufacturing machine 70 (machining amount data S3), and allow the adjustment of the machining condition having higher accuracy.

As another modification of the machine learning device 100 of the machining condition adjustment device 1, the state observation unit 106 may further observe acceleration/deceleration data S4 indicative of the number of times of acceleration and deceleration of each tool in one machining by the manufacturing machine 70 as the state variable S. A total obtained by multiplying the number of times of cutting feed by 2 (acceleration and deceleration) for each tool based on the analysis result of the machining program may be used as the acceleration/deceleration data S4.

According to the above modification, it becomes possible for the machine learning device 100 to determine the adjustment of the machining condition of each used tool used in the machining by manufacturing machine 70 to the other state variables S and the acceleration/deceleration of each used tool used in the machining by the manufacturing machine 70 (acceleration/deceleration data S4), and allow the adjustment of the machining condition having higher accuracy.

Figure 4:
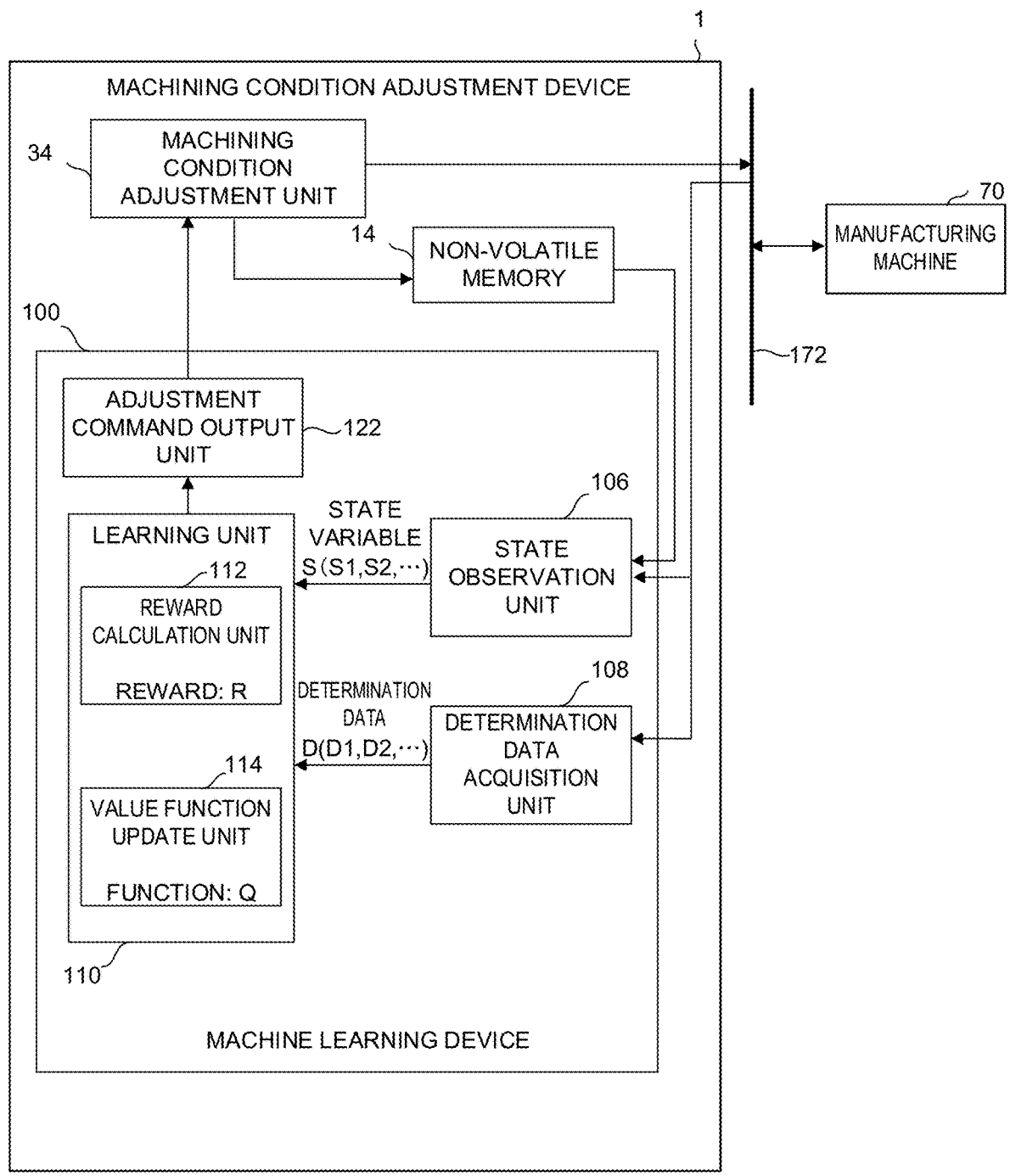
FIG. 4 is a schematic functional block diagram showing one mode of the machining condition adjustment device.

In the machine learning device 100 having the above configuration, the learning algorithm executed by the learning unit 110 is not particularly limited, and it is possible to use a known learning algorithm as the machine learning. FIG. 4 shows one mode of the machining condition adjustment device 1 shown in FIG. 2, and shows a configuration including the learning unit 110 that executes reinforcement learning as an example of the learning algorithm. Reinforcement learning is a method that repeats a cycle in which a current state of an environment having a learning target (i.e., an input) is observed, a predetermined action (i.e., an output) is executed in the current state, and some reward for the action is provided through a trial and error process to learn a policy that maximizes the total amount of the reward (the adjustment of the machining condition of each used tool used in the machining by the manufacturing machine 70 in the machine learning device of the present application) as the optimal solution.

In the machine learning device 100 of the machining condition adjustment device 1 shown in FIG. 4, the learning unit 110 includes a reward calculation unit 112 that determines a reward R related to the result of the appropriateness determination of one machining by the manufacturing machine 70 (corresponds to the determination data D used in the learning period immediately subsequent to the learning period in which the state variables S are acquired) in the case where the adjustment of the machining condition of each used tool used in the machining by the manufacturing machine 70 is performed based on the state variables S, and a value function update unit 114 that updates a function Q representing the value of the adjustment of the machining condition of each used tool used in the machining by the manufacturing machine 70 by using the reward R. The learning unit 110 learns the adjustment of the machining condition of each used tool used in the machining by the manufacturing machine 70 to the machining condition of each used tool used in the machining by the manufacturing machine 70 and the cycle time of one machining by the manufacturing machine 70 by causing the value function update unit 114 to repeat the update of the function Q.

A description will be given of an example of the algorithm of reinforcement learning executed by the learning unit 110. The algorithm in this example is known as Q-learning, and is a method for learning the function Q(s,a) representing the value of the action in the case where an action a is selected in a state s with the state s of an agent and the action a that can be selected by the agent in the state s used as independent variables. Selection of the action a by which the value function Q becomes maximum in the state s is the optimal solution. Q-learning is started in a state in which a correlation between the state s and the action a is unknown, the value function Q is repetitively updated by repeating a trial and error process in which various actions a are selected in any state s, and the value function Q is caused to approach the optimal solution. Herein, it is possible to cause the function Q to approach the optimal solution in a relatively short time period by adopting a configuration in which, when the environment (i.e., the state s) changes as the result of selection of the action a in the state s, the reward r corresponding to the change (i.e., weighting of the action a) is obtained, and guiding the learning such that the action a that allows the obtainment of the higher reward r is selected.

In general, the update equation of the value function Q can be represented by the following Equation (1). In Equation (1), $s_t$ and $a_t$ represent the state and the action at a time t, and the state is changed to $s_{t+1}$ by the action $a_t$. $r_{t+1}$ is the reward obtained by change of the state from $s_t$ to $s_{t+1}$. The term of maxQ denotes Q when the action a by which the value function Q becomes maximum (by which it is considered at the time t that the value function Q becomes maximum) is taken at a time t+1. α and γ represent a learning factor and a discount rate, and are arbitrarily set so as to satisfy 0<α≤1 and 0<γ≤1.

$$Q(s_t, a_t) \leftarrow Q(s_t, a_t) + \alpha\left(r_{t+1} + \gamma \max_a Q(s_{t+1}, a) - Q(s_t, a_t)\right) \quad (1)$$

In the case where the learning unit 110 executes Q-learning, the state variables S observed by the state observation unit 106 and the determination data D acquired by the determination data acquisition unit 108 correspond to the state s in the update equation, the action related to how to determine the adjustment of the machining condition of each used tool used in the machining by the manufacturing machine 70 to the current state (i.e., the machining condition of each used tool used in the machining by the manufacturing machine 70 and the cycle time of one machining by the manufacturing machine 70) corresponds to the action a in the update equation, and the reward R determined by the reward calculation unit 112 corresponds to the reward r in the update equation. Therefore, the value function update unit 114 repeatedly updates the function Q representing the value of the adjustment of the machining condition of each used tool used in the machining by the manufacturing machine 70 to the current state by Q-learning that uses the reward R.

The reward R determined by the reward calculation unit 112 can be a positive (plus) reward R, e.g., in the case where the result of the appropriateness determination of one machining by the manufacturing machine 70 indicates "appropriate" when the adjustment of the machining condition of the manufacturing machine 70 is made based on the adjustment of the machining condition that is determined after the determination of the adjustment of the machining condition of each used tool used in the machining by the manufacturing machine 70 (for example, in the case where power consumption in one machining by the manufacturing machine 70 becomes lower than predetermined reference power consumption, the case where the power consumption in one machining by the manufacturing machine 70 becomes lower than power consumption in one machining by the manufacturing machine 70 based on the machining condition before the adjustment, or the case where the cycle time in one machining by the manufacturing machine 70 approaches the longest cycle time). On the other hand, the reward R determined by the reward calculation unit 112 can be a negative (minus) reward R in the case where the result of the appropriateness determination of the operation state of the manufacturing machine 70 indicates "inappropriate" when the adjustment of the machining condition of the manufacturing machine 70 is made based on the adjustment of the machining condition that is determined after the determination of the adjustment of the machining condition of each used tool used in the machining by the manufacturing machine 70 (for example, in the case where the power consumption in one machining by the manufacturing machine 70 exceeds the predetermined reference power consumption, the case where the power consumption in one machining by the manufacturing machine 70 exceeds the power consumption in one machining by the manufacturing machine 70 based on the machining condition before the adjustment, or the case where the cycle time in one machining by the manufacturing machine 70 moves away from the longest cycle time). The absolute values of the positive and negative rewards R may be equal to or different from each other. In addition, the determination may also be performed by using the determination condition in which a plurality of values included in the determination data D are combined.

Further, the result of the appropriateness determination of one machining by the manufacturing machine 70 can be represented by a plurality of levels instead of only two levels of "appropriate" and "inappropriate". For example, in the case where reference power consumption in one machining by the manufacturing machine 70 is $P_{max}$, it is possible to adopt a configuration in which the reward R=5 is provided when power consumption P in one machining by the manufacturing machine 70 satisfies $0 \leq P < P_{max}/5$, the reward R=3 is provided when the power consumption P satisfies $P_{max}/5 \leq P_{max} < P_{max}/2$, the reward R=2 is provided when the power consumption P satisfies $P_{max}/2 \leq P < P_{max}$, and the reward R=1 is provided when the power consumption P satisfies $P_{max} \leq P$. In addition, the provision of the reward may be appropriately adjusted in accordance with the purpose of learning. For example, a large minus reward may be provided when the cycle time in one machining by the manufacturing machine 70 exceeds the longest cycle time. Further, it is also possible to set $P_{max}$ to a relatively large value in the initial stage of the learning, and reduce $P_{max}$ as the learning progresses.

The value function update unit 114 can be provided with an action value table in which the state variables S, the determination data D, and the reward R are associated with an action value represent by the function Q (e.g., a numerical value). In this case, updating of the function Q by the value function update unit 114 is equivalent to updating of the action value table by the value function update unit 114. At the start of Q-learning, the correlation between the current state of the environment and the adjustment of the machining condition of each used tool used in the machining by the manufacturing machine 70 is unknown, and hence various state variables S, pieces of the determination data D, and rewards R are prepared in the action value table so as to be associated with the values of the action value (functions Q) that are randomly determined. Note that, when the determination data D is found, the reward calculation unit 112 can calculate the reward R corresponding to the determination data D immediately, and the calculated reward R is written into the action value table.

When Q-learning is advanced by using the reward R corresponding to the result of the appropriateness determination of the operation state of the manufacturing machine 70, the learning is guided toward the selection of the action that allows obtainment of the higher reward R, the value of the action value (function Q) of the action taken in the current state is rewritten according to the state of the environment (i.e., the state variables S and the determination data D) that changes as the result of execution of the selected action in the current state, and the action value table is thereby updated. By repeating the update, the value of the action value (function Q) displayed in the action value table is rewritten such that a more appropriate action (in the case of the present invention, an action that reduces the power consumption after causing the cycle time of one machining by the manufacturing machine 70 to further approach the longest cycle time) has a larger value. Thus, the unknown correlation between the current state of the environment (the machining condition of each used tool used in the machining by the manufacturing machine 70 and the cycle time of one machining by the manufacturing machine 70) and the action to the current state (the adjustment of the machining condition of each used tool used in the machining by the manufacturing machine 70) is gradually revealed. That is, by the update of the action value table, the relation between the machining condition of each used tool used in the machining by the manufacturing machine 70 and the cycle time of one machining by the manufacturing machine 70, and the adjustment of the machining condition of each used tool used in the machining by the manufacturing machine 70 is caused to gradually approach the optimal solution.

Figure 5:
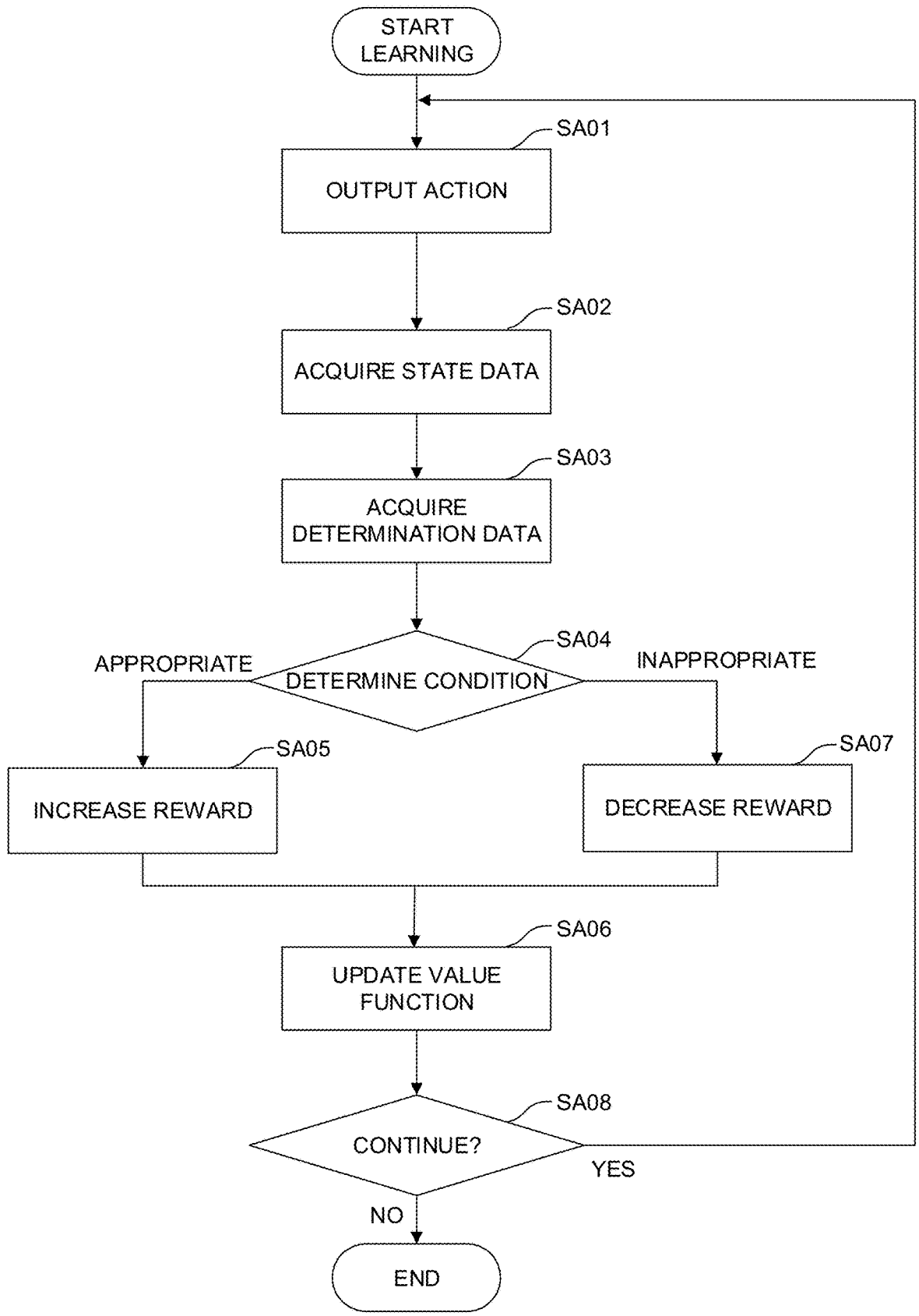
FIG. 5 is a schematic flowchart showing one mode of a machine learning method.

The above-described procedure of Q-learning (i.e., one mode of the machine learning method) executed by the learning unit 110 will be further described with reference to FIG. 5. First, in Step SA01, the value function update unit 114 randomly selects the adjustment of the machining condition of each used tool used in the machining by the manufacturing machine 70 as the action that is taken in the current state indicated by the state variables S observed by the state observation unit 106 while referring to the current action value table. Next, the value function update unit 114 captures the state variables S in the current state observed by the state observation unit 106 in Step SA02, and captures the determination data D in the current state acquired by the determination data acquisition unit 108 in Step SA03. Subsequently, the value function update unit 114 determines whether or not the adjustment of the machining condition of each used tool used in the machining by the manufacturing machine 70 is appropriate based on the determination data D in Step SA04. In the case where the value function update unit 114 determines that the adjustment of the machining condition is appropriate, the value function update unit 114 applies the positive reward R determined by the reward calculation unit 112 to the update equation of the function Q in Step SA05, and then updates the action value table by using the state variables S and the determination data D in the current state, the reward R, and the value of the action value (the function Q after update) in Step SA06. In the case where the value function update unit 114 determines that the adjustment of the machining condition of each used tool used in the machining by the manufacturing machine 70 is inappropriate in Step SA04, the value function update unit 114 applies the negative reward R determined by the reward calculation unit 112 to the update equation of the function Q in Step SA07, and then updates the action value table by using the state variables S and the determination data D in the current state, the reward R, and the value of the action value (the function Q after update) in Step SA06. The learning unit 110 repetitively updates the action value table by repeating Steps SA01 to SA07, and advances the learning of the adjustment of the machining condition of each used tool used in the machining by the manufacturing machine 70. Note that the process for determining the reward R and the process for updating the value function in Steps SA04 to SA07 are executed on each piece of data included in the determination data D.

Figure 6A:
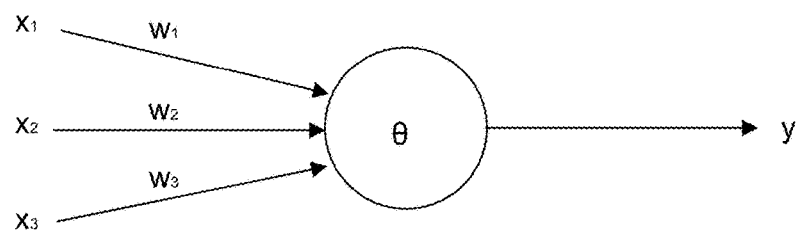
FIG. 6A is a view for explaining a neuron.
Figure 6B:
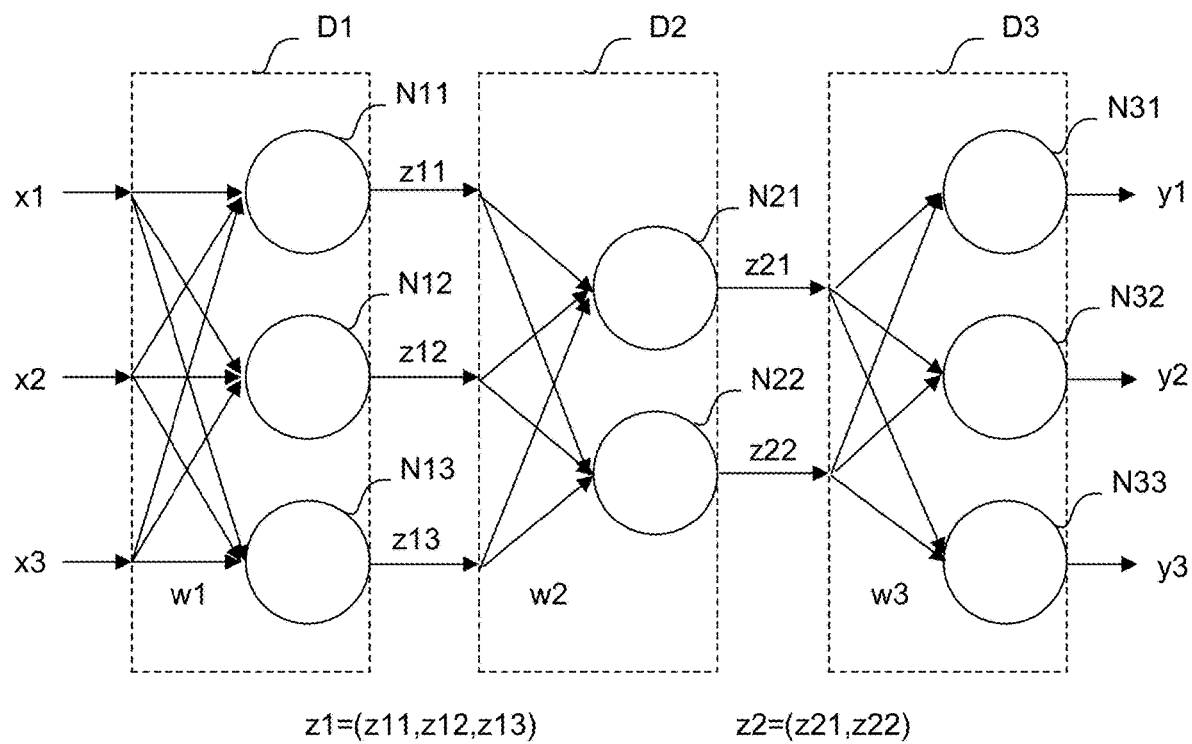
FIG. 6B is a view for explaining a neural network.

It is possible to use, e.g., a neural network when reinforcement learning described above is advanced. FIG. 6A schematically shows a neuron model. FIG. 6B schematically shows the model of the neural network having three layers that is constituted by combining neurons shown in FIG. 6A. The neural network can be configured by, e.g., an arithmetic unit or a storage unit that simulates the neuron model.

The neuron shown in FIG. 6A outputs a result y corresponding to a plurality of inputs x (herein, inputs $x_1$ to $x_3$ are shown as an example). The individual inputs $x_1$ to $x_3$ are multiplied by weights w ($w_1$ to $w_3$) corresponding to the inputs x. This enables the neuron to output the output y represented by the following Equation (2). Note that, in Equation (2), all of the input x, the output y, and the weight w are vectors. In addition, θ is a bias, and $f_k$ is an activation function.

$$y = f_k(\Sigma_{i=1}^{n} x_i w_i - \theta) \quad (2)$$

In the neural network having three layers shown in FIG. 6B, a plurality of inputs x (herein, inputs x1 to x3 are shown as an example) are input from the left side, and results y (herein, results y1 to y3 are shown as an example) are output from the right side. In an example shown in the drawing, the inputs x1, x2, and x3 are multiplied by corresponding weights (collectively represented by w1), and are input to each of three neurons N11, N12, and N13.

In FIG. 6B, the individual outputs of the neurons N11 to N13 are collectively represented by z1. z1 can be regarded as feature vectors obtained by extracting the feature amounts of input vectors. In the example shown in the drawing, the feature vectors z1 are multiplied by corresponding weights (collectively represented by w2), and are input to each of two neurons N21 and N22. The feature vectors z1 represent features between the weights w1 and the weights w2.

In FIG. 6B, the individual outputs of the neurons N21 and N22 are collectively represented by z2. z2 can be regarded as feature vectors obtained by extracting the feature amounts of the feature vectors z1. In the example shown in the drawing, the feature vectors z2 are multiplied by corresponding weights (collectively represented by $w_3$), and are input to each of three neurons N31, N32, and N33. The feature vectors z2 represent features between the weights w2 and the weights $w_3$. Lastly, the neurons N31 to N33 output results y1 to y3.

Note that it is also possible to use the method of so-called deep learning that uses the neural network having four or more layers.

In the machine learning device 100 of the machining condition adjustment device 1, the learning unit 110 performs computation using a multilayer structure that is based on the neural network described above by using the state variables S and the determination data D as the inputs x, and the adjustment of the machining condition of each used tool used in the machining by the manufacturing machine 70 (the result y) can be thereby output. In addition, in the machine learning device 100 of the machining condition adjustment device 1, the learning unit 110 performs computation using the multilayer structure that is based on the neural network described above by using the neural network as the value function in Q-learning, and using the state variables S and the action a as the inputs x, and the value of the action (the result y) in the state can also be thereby output. Note that the operation mode of the neural network includes a learning mode and a value prediction mode and, for example, it is possible to learn the weight w by using a learning data set in the learning mode, and perform value determination of the action by using the learned weight w in the value prediction mode. Note that, in the value prediction mode, it is also possible to perform detection, classification, and deduction.

The configuration of the machining condition adjustment device 1 described above can be described as a machine learning method (or software) executed by the processor 101. This machine learning method is the machine learning method for learning the adjustment of the machining condition of each used tool used in the machining by the manufacturing machine 70, and a CPU of a computer includes the step of observing the machining condition data S1 as the state variable S representing the current state of the environment in which the machining by the manufacturing machine 70 is performed, the step of acquiring the determination data D indicative of the result of the appropriateness determination of one machining by the manufacturing machine 70 based on a determined operation parameter, and the step of performing learning by associating the machining condition data S1 with the adjustment of the machining condition of each used tool used in the machining by the manufacturing machine 70 using the state variable S and the determination data D.

Figure 7:
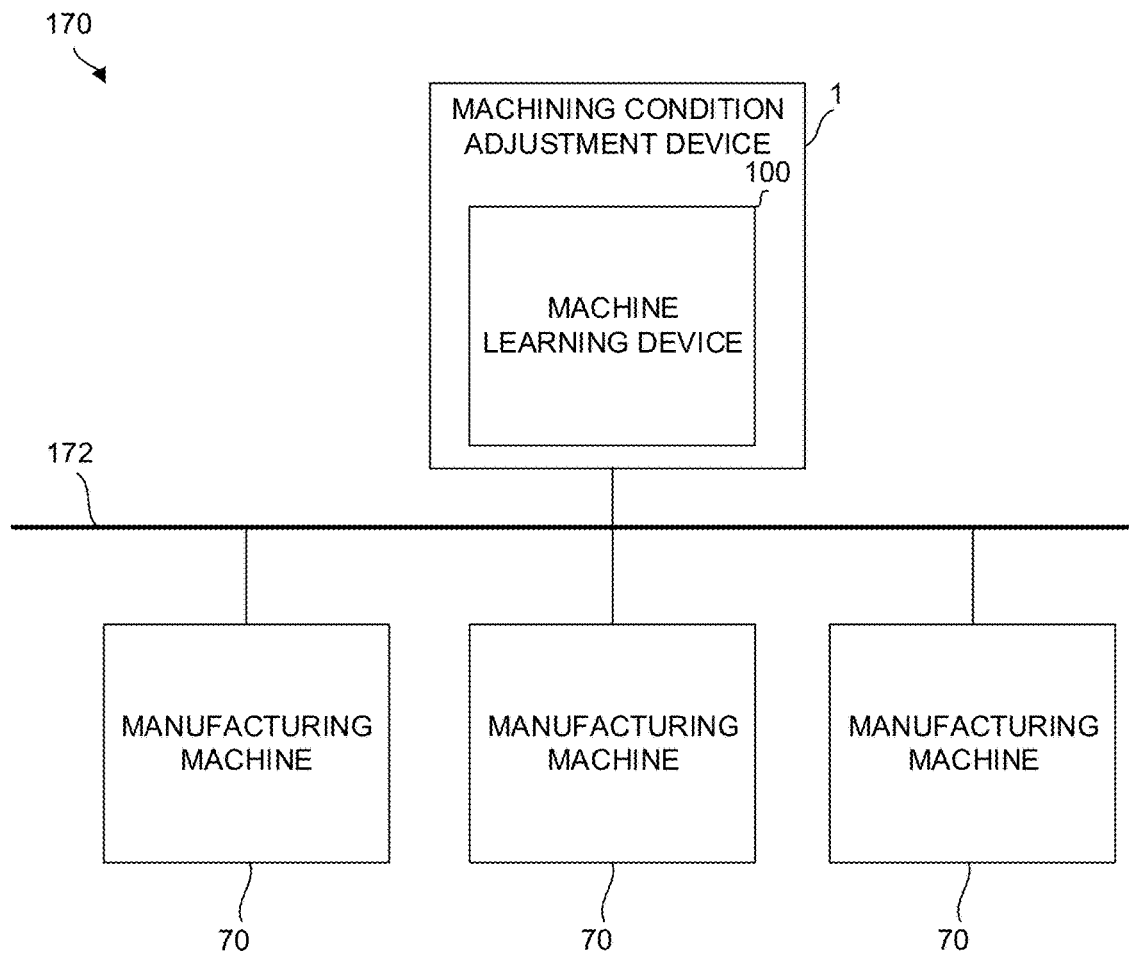
FIG. 7 is a schematic functional block diagram showing one mode of a system into which the machining condition adjustment device is incorporated.
Figure 8:
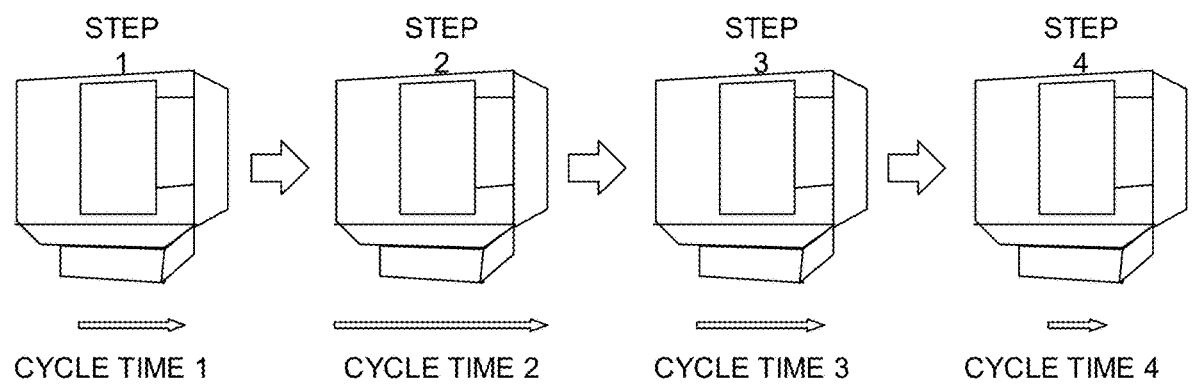
FIG. 8 is a view for explaining a problem that occurs in a line of a manufacturing machine.

FIG. 7 shows a system 170 according to one mode that includes the machining condition adjustment device 1. The system 170 includes at least one machining condition adjustment device 1 that is mounted as part of a computer such as a cell computer, a host computer, or a cloud server, a plurality of the manufacturing machines 70 serving as test targets, and the wired/wireless network 172 that connects the machining condition adjustment device 1 and the manufacturing machines 70.

In the system 170 having the above configuration, the machining condition adjustment device 1 having the machine learning device 100 can automatically and accurately determine the adjustment of the machining condition of each used tool used in the machining by the manufacturing machine 70 to the machining condition of each used tool used in the machining by the manufacturing machine 70 for each manufacturing machine 70 by using the learning result of the learning unit 110. In addition, it is possible to adopt a configuration in which the machine learning device 100 of the machining condition adjustment device 1 learns the adjustment of the machining condition of each used tool used in the machining by the manufacturing machine 70 that is common to all of the manufacturing machines 70 based on the state variables S and the determination data D obtained for each of the plurality of the manufacturing machines 70, and the learning result is shared in machining processes by all of the manufacturing machines 70. Consequently, according to the system 170, it is possible to improve the speed and reliability of the learning of the adjustment of the machining condition of each used tool used in the machining by the manufacturing machine 70 by using more diversified data sets (including the state variables S and the determination data D) as the input.

While the embodiment of the present invention has been described thus far, the present invention is not limited to the example of the embodiment described above, and can be implemented in various forms by making appropriate changes thereto.

For example, the learning algorithm and arithmetic algorithm executed by the machine learning device 100 and the control algorithm executed by the machining condition adjustment device 1 are not limited to those described above, and it is possible to use various algorithms.

In addition, in the embodiment described above, the machining condition adjustment device 1 and the machine learning device 100 are described as the devices having different CPUs, but the machine learning device 100 may also be implemented by the CPU 11 of the machining condition adjustment device 1 and the system program stored in the ROM 12.

The invention claimed is:

1. A machining condition adjustment device for adjusting a machining condition of each of a plurality of manufacturing machines constituting a line, the machining condition adjustment device comprising:
a machine learning device that learns an adjustment of the machining condition of the manufacturing machine,
the machine learning device including
a state observation unit that observes each of machining condition data indicative of the machining condition of each used tool used in machining by the manufacturing machine and cycle time data related to a cycle time of one machining by the manufacturing machine, as a state variable representing a current state of an environment,
a determination data acquisition unit that acquires determination data indicative of a result of an appropriateness determination of one machining by the manufacturing machine in a case where the adjustment of the machining condition is performed, and
a learning unit that performs learning by associating the machining condition data and the cycle time data with the adjustment of the machining condition using the state variable and the determination data.

2. The machining condition adjustment device according to claim 1, wherein
the adjustment of the machining condition reduces power consumption after causing the cycle time of one machining by the manufacturing machine to approach a longest cycle time among the cycle times of one machining by the plurality of manufacturing machines.

3. The machining condition adjustment device according to claim 1, wherein
the state observation unit further observes machining amount data indicative of a machining amount of each tool in one machining by the manufacturing machine, as the state variable.

4. The machining condition adjustment device according to claim 1, wherein
the state observation unit further observes acceleration/deceleration data indicative of the number of times of acceleration and deceleration of each tool in one machining by the manufacturing machine, as the state variable.

5. The machining condition adjustment device according to claim 1, wherein
the learning unit includes
a reward calculation unit that determines a reward related to the result of the appropriateness determination, and
a value function update unit that updates a function representing a value of the adjustment of the machining condition relative to the machining condition data and the cycle time data by using the reward, and
the reward calculation unit provides a high reward in a case where power consumption is reduced after the cycle time of one machining by the manufacturing machine is caused to approach a longest cycle time among the cycle times of one machining by the plurality of manufacturing machines.

6. The machining condition adjustment device according to claim 1, wherein
the learning unit performs computation of the state variable and the determination data using a multilayer structure.

7. A machining condition adjustment device for adjusting a machining condition of each of a plurality of manufacturing machines constituting a line, the machining condition adjustment device comprising:
a machine learning device that has learned an adjustment of the machining condition of the manufacturing machine,
the machine learning device including
a state observation unit that observes each of machining condition data indicative of the machining condition of each used tool used in machining by the manufacturing machine and cycle time data related to a cycle time of one machining by the manufacturing machine, as a state variable representing a current state of an environment, a learning unit that has performed learning by associating the machining condition data and the cycle time data with the adjustment of the machining condition, and an adjustment command output unit that outputs an adjustment command of the machining condition based on the state variable observed by the state observation unit and a learning result of the learning unit.

8. The machining condition adjustment device according to claim 1, wherein the machine learning device is provided in a cloud server.

9. A machine learning device for learning an adjustment of a machining condition of each of a plurality of manufacturing machines constituting a line, the machine learning device comprising:

a state observation unit that observes each of machining condition data indicative of the machining condition of each used tool used in machining by the manufacturing machine and cycle time data related to a cycle time of one machining by the manufacturing machine, as a state variable representing a current state of an environment;

a determination data acquisition unit that acquires determination data indicative of a result of an appropriateness determination of one machining by the manufacturing machine in a case where the adjustment of the machining condition is performed; and a learning unit that performs learning by associating the machining condition data and the cycle time data with the adjustment of the machining condition using the state variable and the determination data.

10. A machine learning device that has learned an adjustment of a machining condition of each of a plurality of manufacturing machines constituting a line, the machine learning device comprising:

a state observation unit that observes each of machining condition data indicative of the machining condition of each used tool used in machining by the manufacturing machine and cycle time data related to a cycle time of one machining by the manufacturing machine, as a state variable representing a current state of an environment;

a learning unit that has performed learning by associating the machining condition data and the cycle time data with the adjustment of the machining condition; and an adjustment command output unit that outputs an adjustment command of the machining condition based on the state variable observed by the state observation unit and a learning result of the learning unit.

11. The machining condition adjustment device according to claim 7, wherein the machine learning device is provided in a cloud server.

* * * * *